United States Patent
Lu et al.

(10) Patent No.: US 7,468,214 B2
(45) Date of Patent: Dec. 23, 2008

(54) TILTED MAGNETIC RECORDING MEDIA

(75) Inventors: Bin Lu, Pittsburgh, PA (US); Dieter Weller, San Jose, CA (US)

(73) Assignee: Seagate Technology LLC, Scotts Valley, CA (US)

(*) Notice: Subject to any disclaimer, the term of this patent is extended or adjusted under 35 U.S.C. 154(b) by 573 days.

(21) Appl. No.: 11/175,858

(22) Filed: Jul. 5, 2005

(65) Prior Publication Data

US 2007/0009766 A1    Jan. 11, 2007

(51) Int. Cl.
*G11B 5/64* (2006.01)

(52) U.S. Cl. ............... 428/836; 428/831.2; 360/131; 360/135

(58) Field of Classification Search .......... None
See application file for complete search history.

(56) References Cited

U.S. PATENT DOCUMENTS

| | | | |
|---|---|---|---|
| 4,902,583 A | 2/1990 | Brucker et al. | |
| 5,605,733 A | 2/1997 | Ishikawa et al. | |
| 5,851,643 A | 12/1998 | Honda et al. | |
| 5,875,082 A | 2/1999 | Takayama et al. | |
| 6,331,364 B1 | 12/2001 | Baglin et al. | |
| 6,671,116 B2 | 12/2003 | Akagi et al. | |
| 6,894,856 B2* | 5/2005 | Nakamura et al. | 360/55 |
| 6,936,353 B1* | 8/2005 | Wu et al. | 428/611 |
| 7,094,483 B2* | 8/2006 | Pelhos et al. | 428/832 |
| 7,282,278 B1* | 10/2007 | Nolan | 428/831.2 |
| 2001/0033949 A1 | 10/2001 | Abarra et al. | |
| 2002/0098381 A1 | 7/2002 | Coffey et al. | |
| 2004/0106009 A1 | 6/2004 | Nakamura et al. | |
| 2006/0002026 A1* | 1/2006 | Stipe et al. | 360/135 |

FOREIGN PATENT DOCUMENTS

| | | |
|---|---|---|
| EP | 675485 | 10/1995 |
| JP | 56083838 | 7/1981 |
| JP | 03054719 | 3/1991 |

(Continued)

OTHER PUBLICATIONS

Gao, K., and Bertram, H., IEEE Trans. Mag., 38(6), 2002, 3675-3683.*

(Continued)

*Primary Examiner*—Kevin M Bernatz
(74) *Attorney, Agent, or Firm*—Westman, Champlin & Kelly, P.A.

(57) ABSTRACT

A tilted magnetic recording medium comprises a layer of magnetic material having a magnetic easy axis defined by tilted alignment of a particular crystalline phase of the magnetic material. A film of (101) and (011) textured $L1_0$ phase of a tetragonal crystalline magnetic material has crystalline c-axes oriented 45° to the medium surface normal. The $L1_0$ crystalline magnetic alloy comprises a first element selected from the group consisting of Co and Fe, and a second element selected from the group consisting of Pt and Pd. A seedlayer comprising a bcc or B2 crystal structure with a natural texture of (110) creates interfacial stress with the magnetic layer, giving rise to a pure (101) and (011) textured $L1_0$ crystalline film. A textured underlying surface facilitates preferential formation of the seedlayer and subsequent growth of the magnetic material to achieve tilted magnetic directions perpendicular to the recording tracks.

18 Claims, 5 Drawing Sheets

FOREIGN PATENT DOCUMENTS

| | | |
|---|---|---|
| JP | 04147418 | 5/1992 |
| JP | 09097413 | 4/1997 |
| JP | 2003051111 | 2/2003 |

OTHER PUBLICATIONS

Danish Patent and Trademark Office Search Report of Counterpart Singapore Patent App. No. SG 200604464-8.

Danish Patent and Trademark Office Written Opinion of Counterpart Singapore Patent App. No. SG 200604464-8.

Xu, Y. et al., "FePt fct-(001) Texture Prepared at Lower Temperature for High Areal Density Perpendicular Recording Media", IEEE Transactions on Magnetics, vol. 38, No. 5, Sep. 2002, pp. 2042-2044.

Jeong, J. et al., "Controlling the Crystallographic Orientation in Ultrathin $L1_0$ FePt(111) Films on MgO(111) Underlayer", IEEE Transactions on Magnetics, vol. 37, No. 4, Jul. 2001, pp. 1268-1270.

Hsu, Y. et al., "In Situ Ordering of FePt Thin Films by Using Ag/Si and Ag/$Mn_3$Si/Ag/Si Templates", IEEE Transactions on Magnetics, vol. 36, No. 5, Sep. 2000, pp. 2945-2947.

Guan, L et al., "Bicrystal Structure of Tilted Perpendicular Media for Ultra-High-Density Recording", Journal of Applied Physics, vol. 93, No. 10, May 15, 2003, pp. 7735-7737.

* cited by examiner

TILTED MAGNETIC RECORDING MEDIA

FIELD OF INVENTION

This invention relates to magnetic recording media, and in particular relates to tilted magnetic recording media.

BACKGROUND OF THE INVENTION

All publications disclosed herein, below are incorporated by reference, as if fully set forth herein.

There are many different forms of mass data storage technology used in modern computing. One of the prevailing forms of data recording is magnetic data recording due to its large storage capacity and re-usable recording media. Magnetic data recording may be implemented utilizing different types of magnetic recording media, including tapes, hard disks, floppy disks, etc. Over the years, significant developments have been made to increase the areal data recording density in magnetic data recording to raise its capacity.

One method for increasing the areal density of the magnetic media, especially for hard disc storage, is to use perpendicular recording media, which have been found to be superior to conventional longitudinal media in achieving very high bit density. In perpendicular recording, the direction the magnetic flux entering the media is substantially normal to the recording surface rather than along the recording surface as in conventional longitudinal recording.

A major factor that limits improvement in areal density of magnetic recording is superparamagnetism. Superparamagnetism comes from thermal excitations perturbing the magnetization of ferromagnetic particles (grains) and rendering the magnetization unstable. As the ferromagnetic grain size is reduced for high areal density recording, superparamagnetic instabilities become more of an issue. The superparamagnetic effect is most evident when the grain volume V is sufficiently small such that the inequality $K_u V/k_B T \geq 60$ (thermally stable for 10 years) can no longer be maintained. $K_u$ is the magnetic crystalline anisotropy energy density of the material, $k_B$ is Boltzmann's constant, and T is the absolute temperature in Kelvin. When this inequality is not satisfied, thermal energy demagnetizes the individual grains and the stored data bits will be unstable. Therefore, as the grain size is decreased in order to increase the areal density, a threshold is reached for a given material $K_u$ and temperature T such that stable data storage is no longer feasible.

It is conceivable to use a recording material with high magnetic crystalline anisotropy $K_u$ to overcome the superparamagnetic effect. However, an increase in the anisotropy $K_u$ will also increase the switching field, $H_0$, which is required to reverse the magnetization direction and is about twice as large as the coercivity $H_C$ of the material. Obviously, $H_0$ cannot exceed the write field capability of the recording head, which currently is limited to about 15 kOe for perpendicular recording.

One method that allows the use of high $K_u$ recording material without an equivalent increase in the switching field $H_0$ is to tilt the easy axis of the recording material with respect to the surface normal of the recording medium surface. It is found that a 45°-tilted magnetization angle with respect to the medium surface normal may result in a required switching field $H_0$ that is approximately half the anisotropy field of the media. In other words the switching field $H_0$ for a recording material with a 45° tilted magnetization angle is about half the switching field for the case of 0° tilt angle. In addition, if aligned in the cross-track direction, a tilted magnetization angle may also help increase the signal-to-noise ratio of the recording media and recording narrow tracks by reducing track edge writing. See, "Transition Jitter Estimates in Tilted and Conventional Perpendicular Recording Media at 1 Tb/in$^2$", Kai-Zhong Gao, Neal Bertram, IEEE Transactions on Magnetics, 39, 704-709 (2003); and "Track Edge Effects in Tilted and Conventional Perpendicular Recording", Kai-Zhong Gao, Xiaobin Wang, Neal Bertram, Journal of Applied Physics, 93, 7840-7842 (2003).

It has been proposed that thin-film deposition at an angle to the substrate surface (oblique incidence) to create an interlayer with a tilted preferred orientation would facilitate the growth of the tilted magnetic layer. A magnetic layer that is subsequently grown on top of the interlayer may take on the tilted orientation wherever hetero-epitaxy is available. However, the oblique incidence approach may cause a large angular dispersion around the tilted preferred orientation. It is conceivable that a collimator may be used to reduce the easy-axis angular spread around the preferred orientation. However, using a collimator will significantly reduce the deposition efficiency of the magnetic material.

Another drawback with using oblique incidence deposition over a substrate, and in particular a circular substrate with circumferential recording tracks, is that the tilted magnetization direction will be largely along the down-track direction in one quadrant of the substrate and substantially along the cross-track direction in an adjacent quadrant. Having a tilted magnetization angle that is along the down-track direction will cause demagnetization field at transition regions, which limits the linear density. On the other hand, having a tilted magnetization angle that is along the cross-track direction will cause non-symmetric track profiles.

Rotating the substrate during deposition may solve the non-uniformity problem, making the tilted magnetization angle along either down-track or cross-track direction. However, the other drawbacks mentioned above still exist.

It has been proposed that by using certain bi-crystal structure, symmetric track profile and sharp transitions may be achieved. See, "Bi-crystal Structure of Tilted Perpendicular Media for Ultra-high-density Recording", Guan, Lijie, Zhu, Jian-Gang, Journal of Applied Physics, 93, (7735-7737) 2003. However, the bi-crystal structure is difficult to implement.

Accordingly, it would be desirable to develop a magnetic recording media that can take advantage of tilted magnetization without the drawbacks of the prior art, such as demagnetization field at transition regions and non-symmetric track profiles.

SUMMARY OF THE INVENTION

The present invention overcomes the drawback of the prior art by providing a tilted magnetic recording medium that comprises a layer of magnetic material having a magnetic easy axis defined by tilted alignment of a particular crystalline phase of the magnetic material.

One aspect of the present invention is the use of a film of (101) and (011) textured $L1_0$ phase of a tetragonal crystalline material for the magnetic recording layer. The substantially $L1_0$ crystalline structure of the magnetic material has high magnetic crystalline anisotropy $K_u$ that allows for smaller data bits and thus, results in a thermally stable and high areal density recording media. In addition, (101) and (011) textured films have their crystalline c-axes and, therefore, magnetic easy axes oriented 45°, or approximately 45°, to the medium surface normal. This 45°-tilted easy axis angle reduces switching field ($H_0$) that is required to write a data bit by about half compared with perpendicular media design. In one embodiment of the present invention, the $L1_0$ crystalline alloys suitable for forming the tilted magnetic medium comprise a first element selected from the group consisting of Co and Fe, and a second element selected from the group consisting of Pt and Pd, e.g., $L1_0$ crystalline FePt.

Another aspect of the present invention is the use of a seedlayer comprising materials with a natural texture of (110) and lattice parameters that closely match those of $L1_0$ crystalline magnetic material (e.g., FePt) in the magnetic recording layer. The seedlayer is supported by the substrate prior to the growth of the magnetic recording layer. By carefully matching the lattice parameters between the seedlayer material and the recording material, interfacial stress between the two layers will give rise to pure (101) and (011) textured $L1_0$ crystalline film in the recording layer. In one embodiment, the seedlayer comprises a material that has a substantially bcc crystal structure. In another embodiment of the present invention, the seedlayer is made of a material that has a substantially B2 structure.

Still another aspect of the present invention is providing a physically or mechanically textured underlying surface (e.g., using "scribed" lines on the substrate surface, soft underlayer or seedlayer), to facilitate preferential formation of the seedlayer, and subsequent growth of the magnetic material so that the tilted magnetic directions can be directed along a plane that is substantially perpendicular to the recording tracks. By changing the morphology of the substrate surface, the <110> direction of the seedlayer will align in the desired direction when it is formed on the surface. When the $L1_0$ crystalline magnetic material (e.g., FePt) is subsequently grown on the seedlayer, the [101] and [011] of the $L1_0$ crystalline FePt will epitaxially match the <110> direction of the seedlayer. The result is that the easy axes of the $L1_0$ crystalline FePt recording layer is approximately oriented either in +45° or −45° with respect to the medium surface normal and in a plane that is perpendicular to the recording tracks.

BRIEF DESCRIPTION OF THE DRAWINGS

For a fuller understanding of the nature and advantages of the invention, as well as the preferred mode of use, reference should be made to the following detailed description read in conjunction with the accompanying drawings. In the following drawings, like reference numerals designate like or similar parts throughout the drawings.

DETAILED DESCRIPTION

Figure 2:
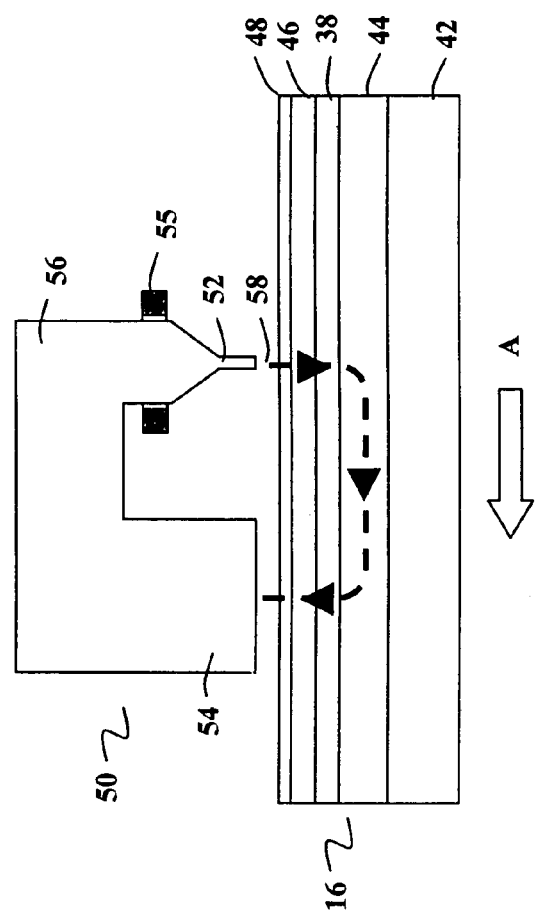
FIG. 2 is a schematic side view of a perpendicular recording system that incorporates a tilted magnetic recording medium in accordance with one embodiment of the present invention.

The present description is of the best presently contemplated mode of carrying out the invention. This description is made for the purpose of illustrating the general principles of the invention and should not be taken in a limiting sense. The scope of the invention is best determined by reference to the appended claims. This invention has been described herein in reference to various embodiments and drawings. It will be appreciated by those skilled in the art that variations and improvements may be accomplished in view of these teachings without deviating from the scope and spirit of the invention.

The present invention overcomes the drawback of the prior art by providing tilted magnetic recording media that comprise a layer of magnetic material having a magnetic easy axis defined by tilted alignment a particular crystalline phase of the magnetic material. As will be detailed below, the recording media comprise a magnetic recording material that has its magnetic easy axis alternating approximately either +45° or −45° with respect to the medium surface normal of the recording medium and perpendicular to the recording track directions. One aspect of the present invention is the use of a (101) or (011) $L1_0$ phase of a face centered tetragonal (fct) crystalline material (such as FePt) as the recording material due to its relatively high $K_u$ and its easy axes pointing at 45° to the medium surface normal. Another aspect of the invention is to provide a novel method that facilitates obtaining a (101) or (011) $L1_0$ FePt film with its easy axes oriented 45° with respect to the medium surface normal. Still another aspect of the invention is to provide a novel method to facilitate obtaining tilted magnetization angles of the $L1_0$ phase crystalline magnetic materials that are defined along a plane that is perpendicular to the recording tracks on the recording medium. A mass storage device that employs tilted magnetic recording layer in accordance with the present invention will likely achieve high-density recording without having its tilted magnetization angles causing either demagnetization field at transition regions or non-symmetric track profiles.

By way of illustration and not limitation, the present invention will be described in connection with a magnetic recording disk drive system, and in particular a perpendicular magnetic recording disk drive system. Perpendicular magnetic recording, as used herein, generally refers to having the write pole of the recording head emit a magnetic flux that is substantially perpendicular to the direction of travel of the recording head and/or recording medium. Although the embodiments of the invention are described herein with reference to perpendicular magnetic recording in disk drives, it will be appreciated that aspects of the invention may also be used in conjunction with other types of recording (e.g., longitudinal) where it may be desirable to deploy the inventive magnetic recording medium.

It is well contemplated that the novel magnetic recording medium of the present invention may be applied to other types of magnetic data recording systems having other disk or substrate configurations, which may comprise in addition to magnetic data recording, other forms of data reading, such as magneto-optical recording system, without departing from the scope and spirit of the present invention. While the present invention is illustrated in reference to a magnetic recording medium that has its magnetic direction tilted in relation to the medium surface normal, it is contemplated that the novel recording medium may be used in a mixed medium where the magnetic angles of other areas of the recording medium are substantially different than the tilted magnetic angle used by the present invention, including the conventional magnetic angles that are either substantially perpendicular or parallel to the medium surface normal of the recording surface.

Figure 1:
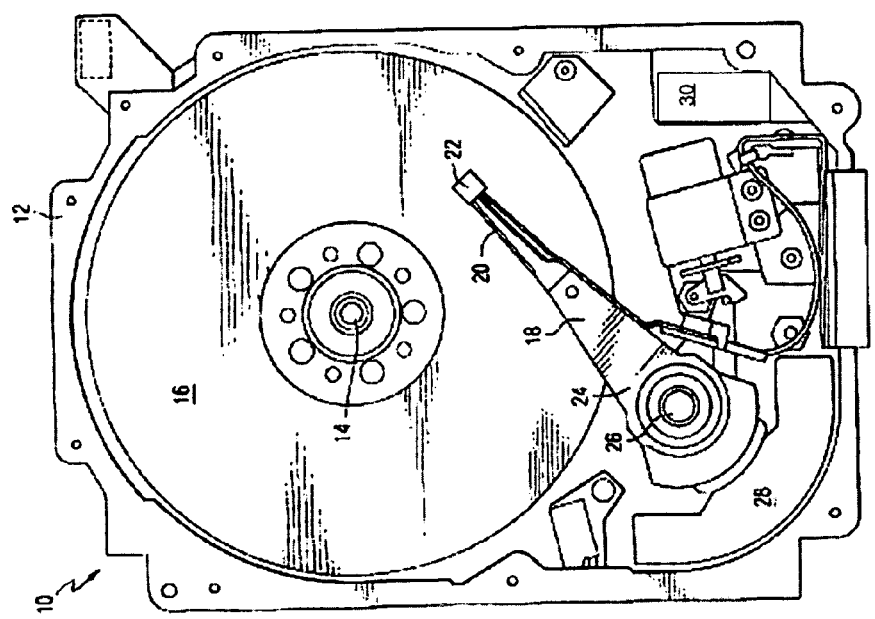
FIG. 1 is a schematic representation of a disk drive incorporating the inventive magnetic recording medium in accordance with one embodiment of the presenting invention.

FIG. 1 is a schematic representation of a disk drive 10 that can utilize the novel recording medium in accordance with this invention. The disk drive 10 includes a housing 12 (with the upper portion removed and the lower portion visible in this view) sized and configured to contain the various components of the disk drive. The disk drive 10 includes a spindle motor 14 for rotating at least one magnetic storage disk that comprises a tilted magnetic recording medium 16 in accordance with the present invention. At least one arm 18 is contained within the housing 12, with each arm 18 having a first end 20 with a recording head or slider 22, and a second end 24 pivotally mounted on a shaft by a bearing 26. An actuator motor 28 is located at the arm's second end 24 for pivoting the arm 18 to position the recording head 22 over a desired sector or track of the disk 16. The actuator motor 28 and other structures of the disk drive 10 is controlled and regulated in part by a controller 30, which may be interfaced to an external controller (not shown).

FIG. 2 is a schematic side view of a perpendicular recording head 50 (which may be supported by a slider such as the slider 22 shown in FIG. 1) and a tilted magnetic recording medium 16 having a structure in accordance with one embodiment of the present invention. The recording head 50 may include a writer section comprising a main write pole 52 and a return pole 54 that are magnetically coupled by a yoke 56. The magnetization coil 55 surrounds the write pole 52 for energizing the recording head 50. It will be appreciated that the recording head 50 may be constructed with a write pole 52 only and no return pole 54 or yoke 56 and that the magnetization coil 55 may surround the yoke 56 instead of the write pole 52. The recording head 50 also may include a read head, not shown, which may be any conventional type read head as is generally known in the art. The magnetic recording medium 16 is positioned adjacent to or under the recording head 50 and travels in the direction of the arrow A. An air-bearing exists and separates the recording head 50 from the medium 16 by a small distance.

The medium 16 is schematically represented as having a layered structure, including a substrate 42, a soft magnetic underlayer 44, a seedlayer 38, a tilted magnetic layer 46 and a protective overcoat 48, in accordance with one embodiment of the present invention. In the illustrated embodiment, the aforementioned layers are stacked (e.g., by deposition) in the sequence shown in FIG. 2. However, it is contemplated that to the extent it is consistent with the features, functions and purpose of the present invention disclosed herein, some of the layers may be stacked in a different sequence not shown. Intermediate layer or layers of materials (e.g., a buffer layer, a primer layer) may be present or provided between the layers mentioned. The reference herein to one layer being adjacent to, above, below, on, or under another layer does not necessarily mean immediately adjacent to, above, below, on, or under, and does not preclude the addition of intermediate layer or layers. Also, certain layer or layers disclosed herein may be omitted or replaced by other equivalent or different layer or layers of material. Furthermore, one or more of the layer structures may include a multilayered structure having sub-layers that are made of same or different materials. The layer structures shown need not be of a continuous structure (e.g., the magnetic layer may comprise a bit patterned tilted magnetic material, or a self assembled monolayer of tilted magnetic material). The layers need not be of uniform thickness (e.g., a planarized layer of tilted magnetic layer). Other variations may be implemented without departing from the scope and spirit of the present invention.

FIG. 2 also shows the magnetic flux 58 passing through the tilted magnetic layer 46 during a recording operation. During the recording operation, the recording medium 16 is passed under the recording head 50, which moves relative to the medium in the direction indicated by arrow A. A current is applied to the magnetization coil 55, which induces a magnetic flux 58 that is directed from the write pole 52 through the tilted magnetic layer 46 and the seedlayer 38, then back to the opposing pole 54. The soft underlayer 44 provides a flux path, which directs the magnetic flux 58 back to the opposing pole 54 of the yoke 56.

The substrate 42 shown in FIG. 2 may comprise any suitable material for hard disks, such as rigid materials including ceramic glass, amorphous glass, Al, or NiP plated AlMg. For floppy disks and magnetic tape applications, suitable flexible materials may be used for the substrate. The soft magnetic underlayer 44 may comprise any suitable material such as, for example, alloys or multilayers comprising Co, Fe, Ni, Pd, Pt, Mn, Ir, Zr, B, N, Al, Nb, Ta or Ru, such as CoFe, CoFeB, FeAlN, NiFe, CoZrNb, CoNiFe, FeTaN, IrMn, PrMn. The soft underlayer 44 may comprise one or multiple sub-layers of the same or different materials. The protective overcoat 48 may include a diamond-like carbon layer.

In accordance with one embodiment of the present invention, a suitable material for the tilted magnetic layer 46 is a substantially $L1_0$ phase of a tetragonal crystalline alloy magnetic material that has a relatively high magnetic anisotropy at ambient temperature. In a further embodiment of the present invention, the $L1_0$ crystalline alloys suitable for forming the tilted magnetic medium comprise a first element selected from the group consisting of Co and Fe, and a second element selected from the group consisting of Pt and Pd (e.g., $L1_0$ crystalline FePt, CoPt, FePd and CoPd). Certain additional elements many be included in the magnetic alloys in a manner that does not alter the properties disclosed herein, without departing from the scope and spirit of the present invention (e.g., FeNiPt). By way of example and not limitation, the presenting invention will be discussed in reference to FePt alloy. In particular, the FePt alloy is a (101) or a (011) textured FePt thin film where the [011] direction (c-axis) alternates between +45° and −45° from the medium surface normal. Textured crystals, as used in the art and as used herein, refers to the preferred alignment of crystalline directions, and the anisotropy in the characteristics (e.g., magnetic) of the crystals.

Figures 3A, 3B:
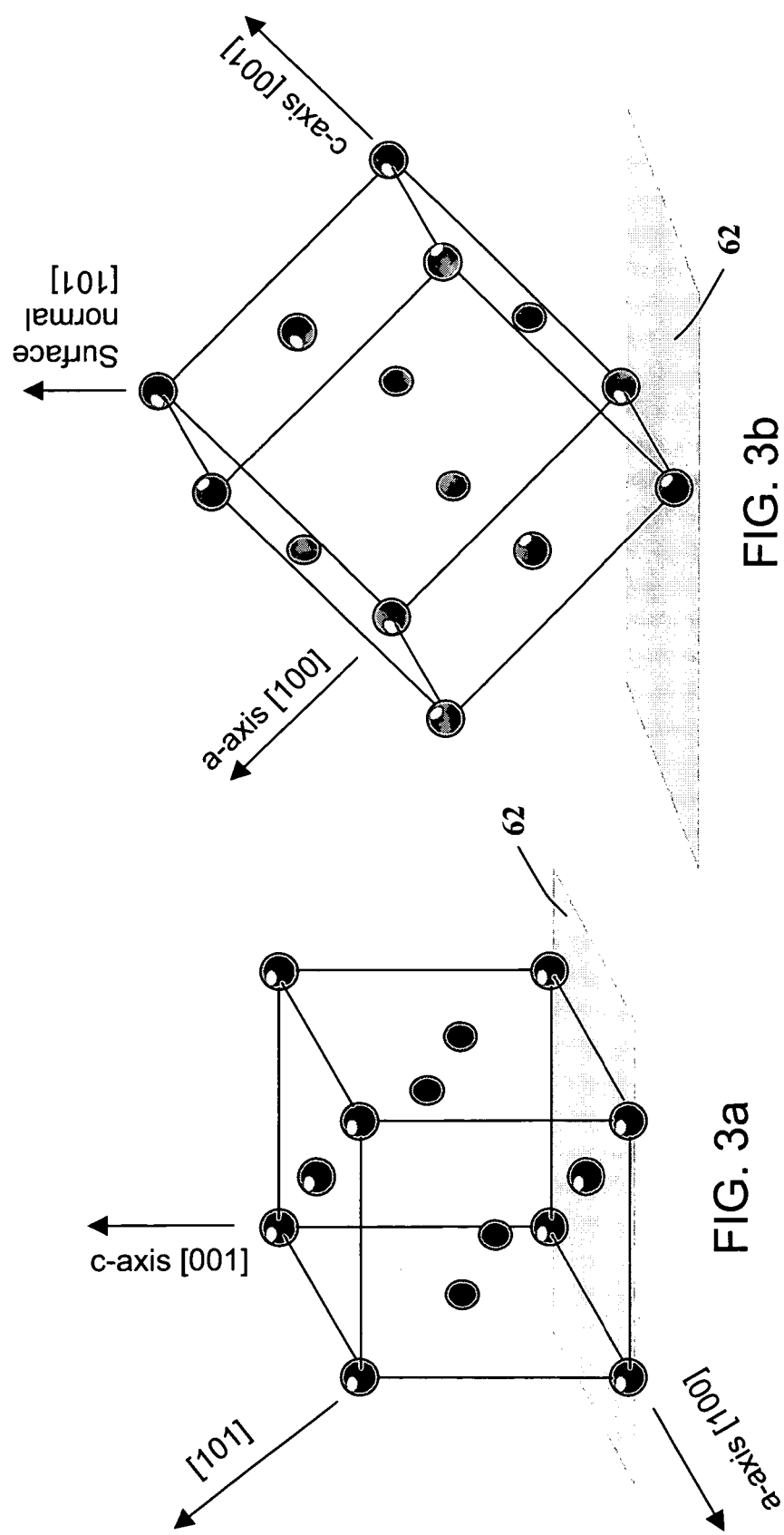
FIG. 3a is a schematic diagram of a $L1_0$ phase of FePt unit cell that has its c-axis oriented perpendicular to the surface plane.
FIG. 3b is a schematic diagram of a $L1_0$ phase of FePt unit cell that has its c-axis oriented 45° relative to the surface plane.

To aid in the understanding of the crystalline structure, reference is made to FIGS. 3a and 3b, which schematically illustrate the different orientations with respect to the substrate surface 62 (the intermediate layers in the recording medium 16 have been omitted for simplicity), for a face-centered tetragonal (fct) unit cell that makes up the crystalline structure of an $L1_0$ phase of FePt alloy. In FIG. 3a, the FePt unit cell has its c-axis oriented parallel to the [001] lattice direction and is perpendicular to the surface plane 62 while its a-axis is oriented parallel to the surface plane 62. In FIG. 3b, the c-axis and the a-axis of the FePt unit cell are both oriented 45° to the medium surface normal, which is oriented in the [101] lattice direction. In FIGS. 3a and 3b, the magnetic moments of the FePt unit cell are preferentially aligned along the c-axes. In accordance with one embodiment of the present invention, the tilted magnetic layer 46 comprises $L1_0$ phase of magnetic alloys oriented in accordance with the crystalline orientation shown in FIG. 3b.

Figure 4:
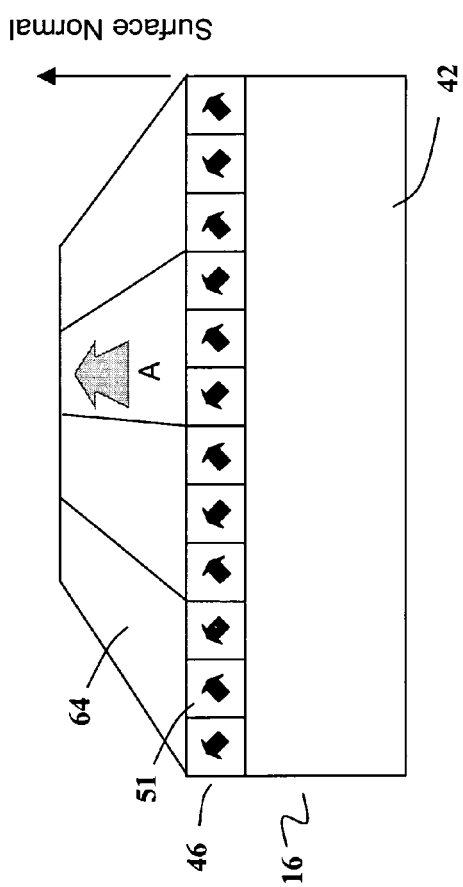
FIG. 4 is a schematic sectional view across the tracks of the tilted magnetic recording medium showing the magnetic directions of the magnetic particles with respect to the medium surface normal and the recording tracks in accordance with one embodiment of the present invention.

FIG. 4 is a diagram that schematically shows the alternating easy axes (e.g. magnetic directions) of the tilted recording layer 46 in a sectional view across the recording tracks 64 of a magnetic disk platter according to one embodiment of the present invention. The view in FIG. 4 is across the recording tracks 64 that are in direction A. For purpose of discussion, each recording track 64 is schematically shown as being three magnetic grains or particles 51 wide, although actual track widths may comprise more or less than three magnetic particles 51. Each magnetic grain or particle may comprise a monocrystalline or polycrystalline structure, having easy axes aligned in the same direction. In the simplified schematic shown in FIG. 4 (and also FIG. 5a to 5c), the soft underlayer 44, seedlayer 38 and the protective overcoat 38 are omitted. The direction of the arrows in the magnetic particles 51 represents the magnetization direction of the magnetic particles 51. The magnetic directions of the magnetic particles 51 in the recording layer 46 alternate between +45° and −45° to the medium surface normal, in a plane that is perpendicular to the recording tracks 64 on the recording medium 16.

Figure 5A:
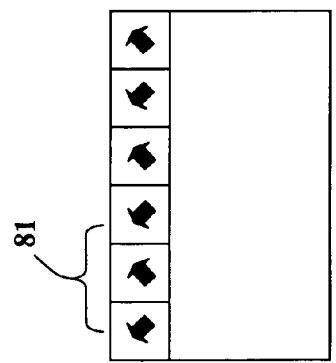
FIG. 5a is a schematic sectional view across the tracks of the recording medium depicting the magnetic directions in the recording layer in the absence of an external magnetic field.
Figure 5C:
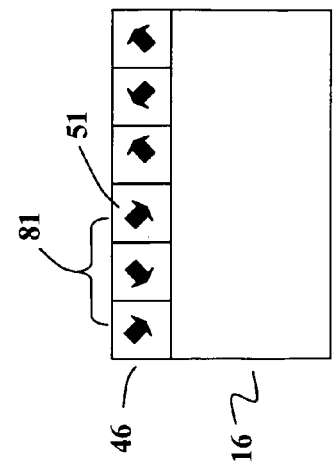
FIG. 5c is a schematic sectional view across the tracks of the tilted recording medium showing the new magnetic directions after the removal of the external magnetic field provided by the write head.
Figure 5B:
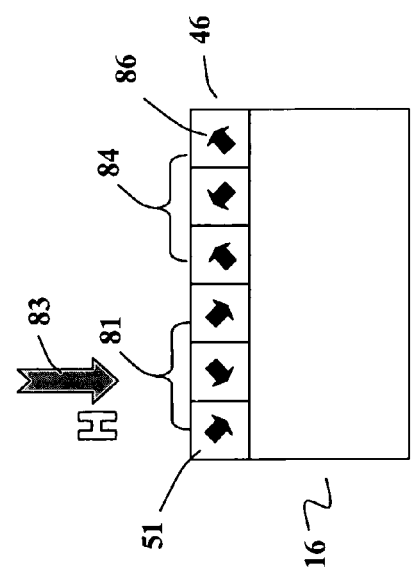
FIG. 5b is a schematic sectional view across the tracks of the tilted recording medium illustrating the reversal of the magnetic directions under the influence of the external magnetic field provided by the write head.

FIGS. 5a to 5c illustrate the sequence of changes to the magnetization of the recording medium 16 according to one embodiment of the present invention. The soft underlayer 44, seedlayer 38 and the protective overcoat 38 are omitted in these simplified schematic figures. The drawings schematically show the magnetization reversal in the magnetic layer 46 when viewed across the recording tracks 64. Reference numerals 81 and 84 shown in the drawing denote a data bit that is three magnetic particles 51 wide. The direction of the arrows in the magnetic particles 51 represents the magnetization direction of the magnetic particles 51. For purpose of illustration, at the initial stage, the magnetization direction in each magnetic particle 51 is set with its vertical component pointed upward. By applying a magnetic field H (in the direction of arrow 83) to the medium 16, a magnetization transition is effected. The medium 16 is moved in the direction of arrow A to record data along the tracks 64.

FIG. 5a represents the state of the recording structure in the absence of the applied magnetic field H. The tilted magnetic directions of the data bit 81 are shown with their vertical component directed upward.

FIG. 5b represents the state of the recording medium 16 in the mid-stage of a data bit recording process. Under the influence of the applied magnetic field H, the magnetic directions of the particles 51 composing the data bit 81 switch their directions. As a result, the vertical components of their magnetization directions are reversed to the downward direction. The data bits 86 in the adjacent recording track 84 are outside the area affected by the applied magnetic field H. As a result, their magnetization directions remain unchanged.

FIG. 5c represents the state of the recording medium 16 after the recording process is completed and the applied magnetic field is removed from the recording medium 16. The data bit 81 retains its new "downward" magnetization direction. The result is a recording of a data bit to a tilted magnetic layer 46 through an applied external magnetic field.

For face-centered tetragonal FePt, the magnetic crystalline anisotropy value $K_u$ is $6.6 \times 10^7$ erg/cc and the saturation magnetization ($M_s$) value is 1140 emu/cc resulting in an anisotropy field $H_k$ value that is approximately 116 kOe ($H_k = 2 \cdot K_u / M_s$). Therefore, the ratio of the demagnetization field ($4 \cdot \pi \cdot M_s$) to the anisotropy field $H_k$ for FePt is approximately 0.12. This low ratio means that the demagnetization effect on the tilted angle is negligible for FePt and compares favorably to other popular recording material such as CoPt where the ratio is approximately 0.42 ($4 \cdot \pi \cdot M_s / H_k = 0.42$ where $K^u = 3 \times 10^6$ erg/cc, Ms=450 emu/cc).

However, depending on the available operating parameters, it may be difficult to switch full ordered FePt by a conventional perpendicular head because of the ultra-hard magnetic properties of FePt, even when the magnetic directions of the FePt are tilted at 45° from the switching field. Therefore, it may be necessary to employ a heat-assisted magnetic recording (HAMR) head, which uses a laser, for example, to heat up the media to temporarily reduce the $H_k$ of the media until it is below the writing field strength of the recording head. The other approach is to use another $L1_0$-phased material(s) with lower $H_k$ value such as FePd, FeNiPt, MnAl, FeCuPt, FeAgPt, CoPt, CoPd, etc. These materials usually have $H_k$ in the range of 15 to 40 kOe.

Depending on the magnetic material and the process, simply depositing a layer of (101) or (001) textured $L1_0$ crystalline FePt thin film onto the disk surface may not permit a tilted magnetic layer profile that is shown in FIG. 4. In some circumstances, the outcome may be a magnetic layer with the magnetic directions (c-axes) randomly oriented along the surface of a cone that opens 45° from the medium surface normal. Moreover, the ratio of the c-axes to the a-axes of the tilted FePt material is approximately 0.98 for bulk $L1_0$ phase FePt, which makes it difficult to differentiate the c-axes from the a-axes of the FePt material. Consequently, (110) textured and (101) and (011) textured FePt will co-exist in the film resulting in only ⅔ of the c-axes of the FePt are in the film plane. In the event of the presence of the aforementioned random magnetization angle profile, the recording density would be reduced.

Therefore, another aspect of the present invention is to provide a seedlayer to promote the formation (e.g., growth) of pure (101) or (011) textured magnetic alloy film. In accordance with one embodiment of the present invention, the seedlayer provides interfacial stress to differentiate the (110) textured FePt film growth from the (101) or the (011) textured FePt film growth. Since interfacial stress works best with very thin films (thickness <10 nm), it is useful for forming $L1_0$ phase of FePt materials with very high magnetic crystalline anisotropy $K_u$, since it can be grown as a very thin film while retaining its effectiveness as a hard magnetic layer.

Figure 6B:
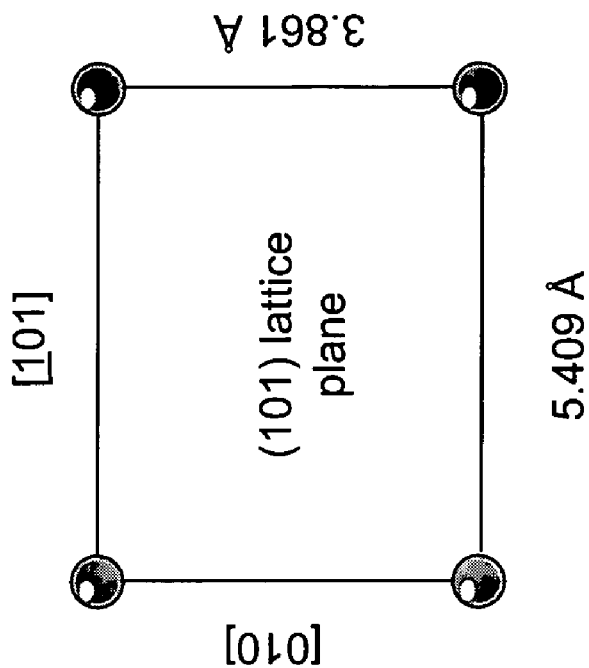
FIG. 6b is a schematic view of a $L1_0$ phase of FePt unit cell along the (101) plane.
Figure 6A:
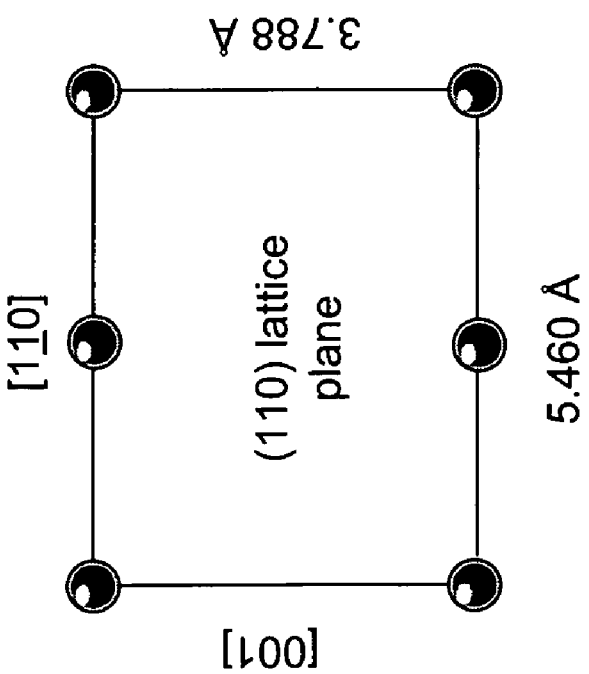
FIG. 6a is a schematic view of a $L1_0$ phase of FePt unit cell along the (110) plane.

FIGS. 6a and 6b schematically illustrate a section of an $L1_0$ ordered phase unit cell of FePt along the (110) lattice plane and the (101) lattice plane, respectively. The (101) plane shares the same lattice dimensions with the (011) plane. The lattice dimensions of the (110) plane, on the other hand, are different from that of the (101) plane and the (011) plane. Using the bulk value, the side ratio for an $L1_0$ crystalline FePt unit cell along the (110) plane is 5.460 Å/3.788 Å=1.441. The side ratio for an $L1_0$ crystalline FePt unit cell along the (101) or the (011) lattice plane is approximately 5.409 Å/3.861 Å=1.401. The side ratio for a non-distorted cubic structure such as body-centered cubic (bcc) or B2 is $\sqrt{2}$=1.414. Therefore, the side ratio for a non-distorted cubic structure is closer to the side ratio of either the (101) or the (011) plane of $L1_0$ crystalline FePt than the (110) plane of the same material. As a result, if a material with a natural (110) texture and a side ratio close to 1.401 is deposited on to the surface as a seedlayer, (101) or (011) oriented grains of $L1_0$ crystalline FePt are more likely than (110) oriented grains of $L1_0$ crystalline FePt to grow on top of such seedlayer because the resulting arrangement will produce minimal interfacial stress. In addition, the seedlayer 38 may be made using one or multiple sublayers comprising the same or different materials.

In one embodiment of the present invention, the seedlayer 38 is a continuous layer that comprises a material that has a bcc crystal structure, a natural texture of (110) and a side lattice dimension of between 2.7 Å to 3.4 Å. For example, suitable bcc materials for the seedlayer include Nb (a=3.301 Å), Ta (a=3.298 Å), W (a=3.165 Å), Mo (a=3.165 Å), V (a=3.023 Å) and Cr (a=2.885 Å) and their alloys. These materials may be deposited on the soft underlayer 44 using known process to maintain the (110) surface plane required to minimize the interfacial stress between the seedlayer and the (101) or (011) $L1_0$ crystalline FePt material.

In another embodiment of the present invention, the seedlayer is made of a material that has a B2 structure, a natural texture of (110) and a side lattice dimension of between 3.7 Å to 4.0 Å. Such suitable B2 seedlayer materials include MgLa (a=3.97 Å), MgCe (a=3.90 Å), MgPr (a=3.88 Å), LaAg (a=3.814 Å), CeAg (a=3.746 Å), PrAg (a=3.739 Å), LaZn (a=3.75 Å), CeZn (a=3.3.70 Å), PrZn (a=3.67 Å), LaCd (a=3.90 Å), CeCd (a=3.86 Å), PrCd (a=3.82 Å) and YAl (a=3.754 Å). These materials have a minimum temperature for the phase stablilization ($T_{min}$) of approximately 200° C. to 300° C. and will form the B2 structure at room temperature. An exception to this rule is MgPr which has a $T_{min}<0°$ C. Similar material may be used for the seedlayers for the other $L1_0$ crystalline magnetic alloys.

Thin $L1_0$ crystalline FePt film that is grown using known process on a seedlayer will have a (101) or (011) texture with its c-axes oriented 45° to the medium surface normal. In one embodiment, the FePt film is a continuous alloy film formed on the seedlayer. However, the c-axes remain randomly oriented along the surface of a cone that opens 45° from the medium surface normal. Therefore, another aspect of the present invention is to promote growth of a magnetic recording layer that has the orientation of the c-axes in directions tilted with respect to the medium surface normal and along a plane that is perpendicular to the recording track directions on the disk platter.

Figure 7:
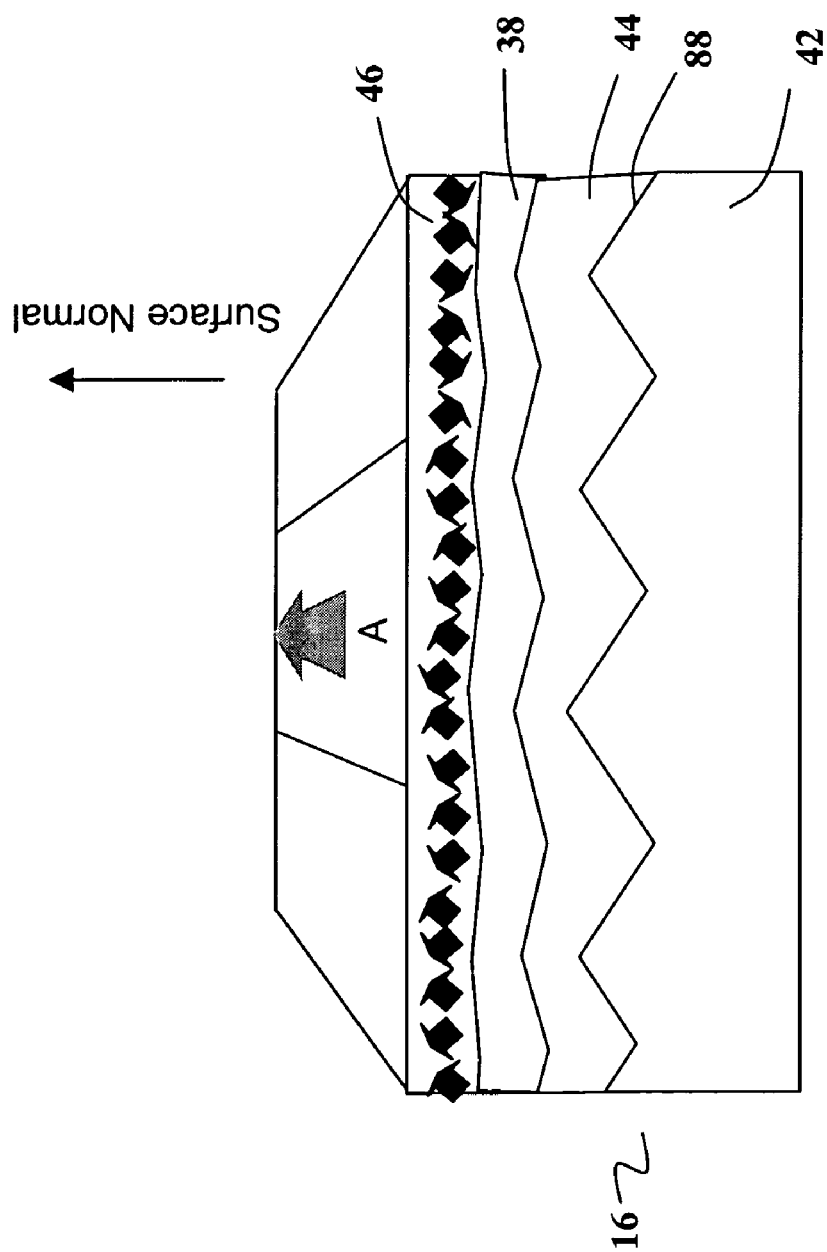
FIG. 7 is a schematic sectional view across the tracks of a recording media showing the interlayer morphologies used to facilitate the growth of the recording layer with desirable tilted preferred orientations.

FIG. 7 is a diagram showing a cross section of a tilted recording medium 16 that has been formed on a physically or mechanical textured substrate according to an embodiment of the present invention. The protective overcoat 48 is not shown in this simplified diagram to maintain clarity. One embodiment of the present invention is to use a textured surface having circumferential grooves 88 to promote the growth of a tilted recording layer 46 that has its magnetization directions tilted with respect to the disk platter and perpendicular to the recording track directions A. (The circumferential grooves 88 are schematically represented by a hill-and-valley configuration. The relative shape, size, and span of the textured grooves 88 in relation to other structure are exaggerated and not drawn to proportion in FIG. 7). Using known process (e.g., magnetic disk surface texture processing, micro-scribing), annular or circumferential grooves 88 are formed on the substrate 42. A soft underlayer 44 of suitable thickness is deposited on the modified substrate 42 and the surface morphology of this soft underlayer 44 replicates the directions and orientations of the grooves 88 on the surface of the substrate 42. A seedlayer 38 is formed on top of the soft underlayer 44 and the morphology of the soft underlayer 44 causes the <110> direction of the seedlayer 38 to align in the radial direction. Subsequently, when $L1_0$ crystalline FePt is deposited as the recording layer 46 on top of the seedlayer 38, the [1̲01] or [01̲1] of the $L1_0$ FePt will epitaxially match the <110> direction of the seedlayer 38. As a result, the c-axes of the $L1_0$ crystalline FePt are approximately oriented either in +45° (in the [1̲01] case) or −45° (in the [01̲1] case) with the medium surface normal and along a plane that is perpendicular to the recording track directions (i.e., in the disk radial direction). The grooves 88 at the surface of the substrate 42 may be formed with their peak-to-valley values ranging from 1 Å to 1 nm and their peak-to-peak (or valley-to-valley) dimensions ranging from 5 nm to 1 mm. The groove density may be of the order of the track density, or higher.

The processes for physically texturing disk substrates have been reported in many publications. References may be made to J. K. Lee, A. Chao, J. Enguero, M. Smallen, H. J. Lee, and P. Dion, "Effect of Disk Cross Hatch Texture on Tribological Performance" IEEE Trans. Magn. 28, 2880 (1992); B. Bhushan, "Magnetic slider/rigid disk substrate materials and disk texturing techniques—status and future outlook" ASME adv. Info. Stor. Syst. 5, 175 (1993); R. Ranjan, D. N. Lambeth, M. Tromel, P. Goglia and Y. Li, "Laser Texturing techniques for high performance magnetic disk drives", IEEE Trans. Magn. 31, 2946 (1995); T. Matsudaira, K. Ishizaki, and C. Krishnan, "Effects of Disk microstexture on glide and modulation at ultra low flying heights" IEEE Trans. Magn. 26, 2429 (1990); and K. Ishizaki, "Texturing of glass substrate by microgrid method", J. Magn. Soc. Jpn, 16, 78 (1992). A suitable texturing process may be adopted, which may incorporate one or a combination of the processes disclosed in these references.

Even though an embodiment of the present inventions uses circumferential grooves 88 on the substrate surface 42 to facilitate the formation of desirable magnetic preferred orientations, it can be appreciated by one skilled in the art that the circumferential grooves may instead be created on the surface of the soft underlayer 44. For example, a non-magnetic layer such as NiP may be plated on top of the soft underlayer 44. Using known processes (e.g. mechanical textured processing or scribing), a series of circumferential grooves are formed on top of the non-magnetic layer prior to the deposition of the seedlayer 38. When the seedlayer 38 is eventually formed on the "scribed" non-magnetic layer, the <110> direction of the seedlayer material will align in the preferred radial direction. It is noted that as the layers build up on the substrate 42, the surfaces of each successive layer become more flat (i.e., each layer to some extent planarizes the layer below). As a result, the seedlayer 38 presents a relatively flat surface for the formation of the magnetic layer 46.

Although an embodiment of the present invention uses mechanically formed circumferential grooves 88 to provide a texture on the surface of the substrate 42, it can be appreciated by one skilled in the art that other non-mechanical process may be used to create the textured lines on the surface of a substrate. For example, photolithography or nano-imprint lithography may be used to create the circumferential line patterns and chemical etching may be used to create the textured lines.

The relative thicknesses of the seedlayer 38 and the tilted magnetic layer 46 and the choice of materials for these layers may be selected to obtain the necessary tilted magnetization angle in relation to the operating magnetic field of the write head 52 and the recording density to be achieved. Further consideration may be given to the thickness and choice of the underlayer 44 and/or substrate 42.

By way of example and not limitation, for a tilted magnetic hard disk drive designed to achieve a data recording density of at least 150 Gbits/cm², it should utilize a write head that is designed to deliver a magnetic field of about H=20 kOe at the tilted magnetic layer, which has a short time coercivity of at least Hc of 10 kOe, operating at an external ambient operating temperature of about 25° C., and an internal (at the inside of the drive housing) ambient temperature of about 75° C. The various layers of the recording medium 16 may be formed by known conventional process steps, such as sputtering, deposition, coating, etc., which may also include the steps of polishing, lapping, laser texturing, washing, cleaning, heat treatment (e.g., annealing), etching, lithographic masking, etc. The materials for the various layers and the thicknesses thereof for a 65 cm diameter hard disk platter (textured as described above) are set forth below:

|  | Material | Thickness Range |
| --- | --- | --- |
| Soft Underlayer | FeCoB | 20 nm–1000 nm |
| Seedlayer | CrW | 5 nm–100 nm |
| Tilted Magnetic Layer | FeNiPt | 2 nm–50 nm |
| Protective Overcoat | Diamond like carbon | 1 nm–10 nm |

While particular embodiments of the invention have been described herein for the purpose of illustrating the invention and not for the purpose of limiting the same, it will be appreciated by those of ordinary skill in the art that numerous variations of the details, materials, and arrangements of parts may be made without departing from the scope of the invention as defined in the appended claims.

What is claimed is:

1. A tilted magnetic recording medium, comprising:
   a substrate; and
   a magnetic film supported by the substrate, the magnetic film comprises a magnetic alloy having a magnetic easy axis defined by preferential tilted alignment of a crystalline phase of the magnetic alloy, wherein the magnetic easy axis is tilted relative to a plane that is substantially perpendicular to recording tracks of the magnetic film, and wherein the magnetic film comprises a film of substantially (101) and (011) textured $L1_0$ phase of a tetragonal crystalline magnetic alloy.

2. The tilted magnetic recording medium of claim 1, wherein c-axis of the tetragonal crystalline magnetic alloy is oriented at an angle substantially 45° relative to the plane.

3. The tilted magnetic recording medium of claim 1, further comprising a seedlayer supported by the substrate and adjacent the magnetic film, wherein the seedlayer having a crystalline structure that promotes the preferential alignment of the crystalline phase of the magnetic alloy in the magnetic film.

4. The tilted magnetic recording medium of claim 3, wherein the seedlayer comprises a crystalline material having a natural texture and lattice parameters that matches those of the crystalline phase of the magnetic alloy in the magnetic film.

5. The tilted magnetic recording medium of claim 3 wherein the seedlayer and the magnetic alloy in the magnetic film creates interfacial stress to give rise to the preferential tilted alignment of the crystalline phase of the magnetic alloy in the magnetic film.

6. The tilted magnetic recording medium of claim 5, wherein the crystalline material of the seedlayer has a substantially body centered cubic or B2 crystal structure.

7. The tilted magnetic recording medium of claim 6, wherein crystalline material of the seedlayer has a natural texture of (110).

8. The tilted magnetic recording medium of claim 5, wherein the interfacial stress gives rise to a film of substantially (101) and (011) textured $L1_0$ phase of the tetragonal crystalline magnetic alloy, whereby [101] and [011] of the $L1_0$ phase of a tetragonal crystalline magnetic alloy epitaxially match <110> direction of the seedlayer.

9. The tilted magnetic recording medium of claim 3, wherein the magnetic alloy comprises a first element selected from the group consisting of Co and Fe, and a second element selected from the group consisting of Pt and Pd.

10. The tilted magnetic recording medium of claim 3, wherein the seedlayer is supported by a textured surface that promotes alignment of the seedlayer and subsequent growth of the magnetic alloy on the seedlayer so that the magnetic easy axis is tilted perpendicular to the recording tracks.

11. The tilted magnetic recording medium of claim 10, wherein the textured surface comprises circumferential grooves in a surface of the substrate.

12. A data storage system, comprising:
   a tilted magnetic recording medium as in claim 1;
   a data recording head directing a magnetic field at the tilted magnetic recording medium; and
   an actuator supporting and positioning the data recording head with respect to the tilted magnetic recording medium to effect data recording.

13. A method of magnetic data recording, comprising the steps of:
   providing a tilted magnetic recording medium as in claim 1;
   providing a data recording head to direct a magnetic field at the tilted magnetic recording medium; and
   supporting and positioning the data recording head with respect to the tilted magnetic recording medium to effect data recording.

14. The method of claim 13, wherein the magnetic field is substantially perpendicular to a plane of the substrate.

15. A method of making a magnetic recording medium, the method comprising:
   providing a substrate;
   supporting a magnetic film on the substrate, wherein the magnetic film comprises a film of substantially (101) and (011) textured $L1_0$ phase of a tetragonal crystalline magnetic alloy having a magnetic easy axis defined by preferential tilted alignment of a crystalline phase of the magnetic alloy;
   supporting a seedlayer on the substrate, adjacent the magnetic film; wherein the seedlayer comprises a crystalline material having a natural texture and lattice parameters that matches those of the crystalline phase of the magnetic alloy in the magnetic film,
   wherein the magnetic easy axis is tilted relative to a plane that is substantially perpendicular to recording tracks of the magnetic film.

16. A magnetic recording medium made in accordance with the method of claim 15.

17. A tilted magnetic recording medium, comprising:
   a substrate, wherein the substrate has a textured surface;
   a seedlayer supported by the textured surface, the seedlayer having a crystalline structure that promotes preferential alignment of a substantially $L1_0$ phase of a tetragonal crystalline magnetic alloy, wherein the textured surface promotes alignment of the crystalline structure of the seedlayer; and a magnetic film supported by the seedlayer, the magnetic film comprises a substantially (101) and (011) textured $L1_0$ phase of a tetragonal crystalline magnetic material, wherein crystalline structure of the seedlayer interacts with the $L1_0$ phase of the tetragonal crystalline magnetic alloy to give rise to a preferential tilted alignment of the $L1_0$ phase of a tetragonal crystalline magnetic alloy, wherein the textured surface and the seedlayer effect tilted alignment of the $L1_0$ phase of the tetragonal crystalline magnetic alloy such that its magnetic easy axis is tilted relative to a plane that is substantially perpendicular to recording tracks of the magnetic film.

18. The tilted magnetic recording medium as in claim 17 wherein c-axis of the tetragonal crystalline magnetic alloy is oriented at an angle substantially 45° relative to the plane.

* * * * *